(12) United States Patent
Kiiski

(10) Patent No.: US 10,765,105 B1
(45) Date of Patent: Sep. 8, 2020

(54) DEVICE FOR MOSQUITO REPELLENTS

(71) Applicant: Proviter Group Oy, Naantali (FI)

(72) Inventor: Veli-Pekka Kiiski, Jämsä (FI)

(73) Assignee: Proviter Group Oy, Naantali (FI)

( * ) Notice: Subject to any disclaimer, the term of this patent is extended or adjusted under 35 U.S.C. 154(b) by 0 days.

(21) Appl. No.: 16/585,212

(22) Filed: Sep. 27, 2019

(51) Int. Cl.
*A62B 7/08* (2006.01)
*A01M 13/00* (2006.01)
*A24F 25/00* (2006.01)
*A01M 29/12* (2011.01)

(52) U.S. Cl.
CPC .................................. *A01M 29/12* (2013.01)

(58) Field of Classification Search
CPC .. A01M 13/00; A01M 1/2066; A01M 1/2072; A61L 9/12; A61L 9/122
USPC .......... 43/125, 138–139, 107, 129; 422/124; 239/44; 261/DIG. 65, 31, 84; 96/222
See application file for complete search history.

(56) References Cited

U.S. PATENT DOCUMENTS

| 5,335,446 | A | 8/1994 | Shigetoyo | |
| 6,413,476 | B1* | 7/2002 | Barnhart | A61L 9/03 422/123 |
| 6,482,365 | B1* | 11/2002 | Soller | A01M 1/2066 422/125 |
| 7,175,815 | B2 | 2/2007 | Yamasaki et al. | |
| 7,597,857 | B2 | 10/2009 | Reece | |
| 7,887,760 | B2 | 2/2011 | Yamamoto et al. | |
| 8,359,785 | B2 | 1/2013 | Ohtsuka et al. | |
| 2003/0175171 | A1 | 9/2003 | Yamamoto et al. | |
| 2015/0201604 | A1* | 7/2015 | Cao | A01M 1/2055 239/44 |

FOREIGN PATENT DOCUMENTS

| CN | 208354435 U | 1/2019 |
| EP | 0962139 A1 | 12/1999 |
| JP | H08154554 A | 6/1996 |
| JP | 2003-009755 A | 1/2003 |

* cited by examiner

*Primary Examiner* — Monzer R Chorbaji
(74) *Attorney, Agent, or Firm* — Ziegler IP Law Group, LLC

(57) ABSTRACT

A device for mosquito repellents, including a support structure having a first end arranged to be positioned on a surface, and a second end opposite the first end, the distance between the first end and the second end defining a height H of the support structure. The device further includes a first plate arranged at the second end of the support structure perpendicularly to a direction of height of the support structure, the plate being void of openings and suitable for receiving a heated mosquito repellent. The device still further includes a fan attached within the support structure, between the first end and the second end of the support structure, to blow air from the first end towards the second end of the support structure and the first plate, and means for operating the fan. The size and shape of the first plate is such that it covers the fan, when seen from the second end of the support structure in the direction of height of the support structure.

16 Claims, 4 Drawing Sheets

DEVICE FOR MOSQUITO REPELLENTS

FIELD

The aspects of the disclosed embodiments relate generally to insect repellents, more specifically to a portable device for spreading mosquito repelling smoke or steam containing mosquito repelling substances.

BACKGROUND AND OBJECTS

Various mosquito repellents and repellents for other bugs are know and sold. The repellents in question in this description are typically of the type that are heated or burned. For example, mosquito coils are well known. These are burnable spirals, typically made of a burnable powder containing pyrethrum or some other active ingredient, which repels mosquitos and other insects. The spirals or coils burn slowly, smouldering, thus spreading the repellent. Another type of known mosquito repellent is for example electronic devices that heat up the substance containing mosquito repelling active ingredient and spread the steam generated by heating the substance. Some heatable mosquito repellents are sold under the tradename of Thermacell®, where a container of mosquito repellent is heated. The repellent may be for example in the form of a liquid in a container, or it may be absorbed on the pad.

A problem of such type of mosquito repellents is that the smoke or steam does not spread evenly and such solutions are not very effective as the effect remains rather limited in space. Document CN 208354435U discloses one possible device for improving spreading of the repellent. The device presented therein has a support structure with air inlet hole at its bottom part and air outlets at its top part. The burnable repellent coil is place at the bottom of the device, and a fan is arranged between the coil and the air outlets at the top of the device. The fan thus makes air circulate and the vaporised or burned repellent is spread around.

Despite the solution proposed in CN 208354435U, there still exists a need to provide an efficient device for mosquito repellents. It is indeed an aim to provide a device where the evaporation or burning of the mosquito repellent product is efficient and the evaporation and burning is carried out in optimal conditions.

SUMMARY

The present description relates to a device for mosquito repellents, comprising
- a support structure having a first end arranged to be positioned on a surface, and a second end opposite the first end, the distance between the first end and the second end defining a height H of the support structure;
- a first plate arranged at the second end of the support structure perpendicularly to a direction of height of the support structure, the plate being void of openings and suitable for receiving a heated mosquito repellent;
- a fan attached within the support structure, between the first end and the second end of the support structure, to blow air from the first end towards the second end of the support structure and the first plate; and
- means for operating the fan;

wherein a size and shape of the first plate is such that it covers the fan, when seen from the second end of the support structure in the direction of height of the support structure.

The present description also relates to a method for improving dispersion of a mosquito repellent in air, consisting of
- arranging a mosquito repellent on a solid surface;
- blowing air from beneath the solid surface towards it; and
- dispersing the mosquito repellent by a by-pass flow of the air blown towards the solid surface.

DETAILED DESCRIPTION

Figure 1:
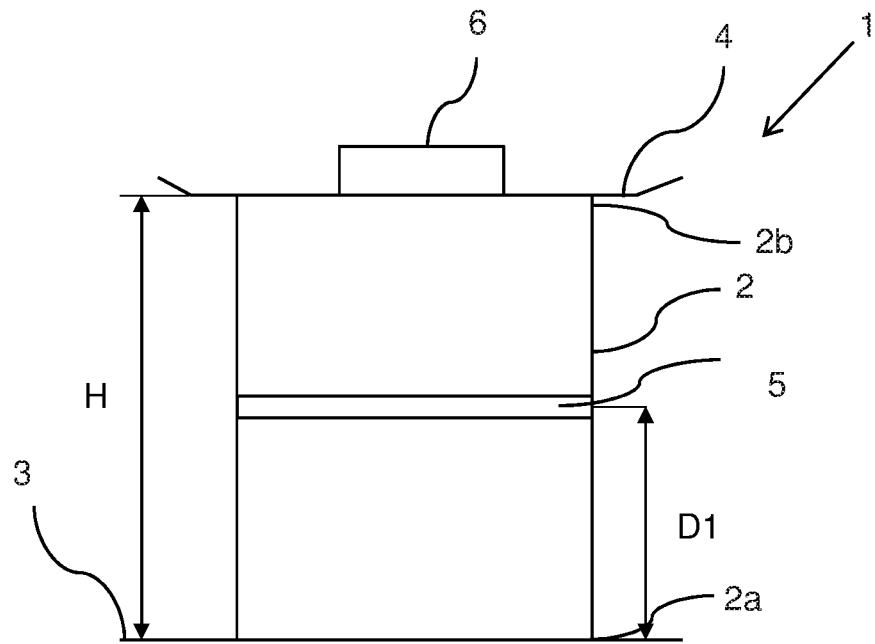
FIG. 1 schematically illustrates a device according to a first embodiment.

The present description relates to a device for mosquito repellents, comprising
- a support structure having a first end arranged to be positioned on a surface, and a second end opposite the first end, the distance between the first end and the second end defining a height H of the support structure;
- a first plate arranged at the second end of the support structure perpendicularly to a direction of height of the support structure, the plate being void of openings and suitable for receiving a heated mosquito repellent;
- a fan attached within the support structure, between the first end and the second end of the support structure, to blow air from the first end towards the second end of the support structure and the first plate; and
- means for operating the fan;

wherein a size and shape of the first plate is such that it covers the fan, when seen from the second end of the support structure in the direction of height of the support structure.

The functioning idea of the present device is thus that the evaporated or burned repellent (i.e. what the repellent releases) is spread efficiently, all around the device, thanks to the fan and the plate. The relative positions of the fan and the plate on which the repellent is arrangeable, ensure efficient and optimal use of the repellent. The present device thus functions based on suction/counter pressure-principle, using a fan for creating a suction of air and a pressure against a plate. The fan directs the air flow against the plate, which plate is at a given distance from the fan.

The present device differs from that of CN 208354435U in that in the present device, the fan is arranged below the plate on top of which the repellent is to be arranged, instead of other way round. The technical effect of this difference is that the repellent is not cooled too much and thus evaporation is optimal and all of the mosquito repellent can be used. Experimental data showing this is given below in the Experimental part. Indeed, if the repellent is arranged below the fan, it is cooled too much, i.e. does not function properly or does not function at all (if it is a burnable coil, the air flow easily extinguishes it). The present device uses an ejector flow at the outlet side of the fan and on top of the device, in order to spread the repellent, while in the device of CN 208354435U, this spreading is done inside the device using suction flow. The use of suction flow (or pre-entry flow) has a cooling effect, which lowers the burning temperature and thus evaporation of the repellent is significantly reduced. The spreading efficiency is also lower, as a more efficient fan cannot be used (because it would cool down too much) without increasing the height of the device. Increasing the height would make the device less suitable for use.

A further advantage of placing the source of the mosquito repellent (or any other insect repellent functioning in the same way) on top of a plate which itself is on top of a fan, is that it is not in direct contact with the air flow. Rather, the repellent is spread with the by-pass flow (ejector effect). Thus, cooling of the repellent device is avoided. The cooling can be as high as 25-30° C. if the repellent is placed below the fan. Thus, the repellent device works at its optimal temperature and can be used fully. Also, the fan remains cleaner as it is not in contact with the repellent, hence its working life is extended. Indeed, if the fan is in contact with the repellent compound, the repellent compound could make the fan dirty and put it off-balance.

Some further advantages of the present device are that it can be made relatively small and low, and especially lower than the device disclosed in CN 208354435U. Furthermore, a more efficient fan can be used because there is no cooling effect on the repellent. When using a burnable coil or similar, it does not extinguish on its own as it may do if no plate is arranged between the coil and the fan.

The present device can keep an area up to 60 m$^2$ free from mosquitos. Moreover, since the evaporated or burned repellent is mixed with a certain, larger amount of air, it does not smell so strongly, while still being efficient against mosquitos. The user experience is thus more pleasant with the present device compared to use without the present device. The principle of air circulation in the present device is shown in a Figure as explained below.

The present device can be used with a battery (for example 12 V) or connected to mains (in which case the device typically comprises a transformer). The device can thus be made versatile to be used in various conditions.

According to an embodiment, the fan is arranged at a distance D1 from the first end of the support structure, D1 being 5-80% of the height H. The distance D1 can thus be from 5, 10, 15, 25, 30, 35, 40, 45, 50, 55, 60 65 or 70% of the height of H (from the first end of the support structure) up to 15, 20, 25, 30, 35, 40, 45, 50, 55, 60 65, 70, 75 or 80% of the height of H (from the first end of the support structure). Preferably the distance D1 is 40-80% of the height H. The distance D1 is measured as the distance between the first end of the support structure to the middle of the fan, in the direction of measurement. In other words, when the fan has a certain thickness, the distance D1 includes half of the thickness also.

The support structure may further comprise a mesh surrounding the support structure. The function of the mesh is mainly to protect the fan, for example of bugs, as well as the users (small children's fingers etc.), and is typically of a cylindrical form. The mesh may be made of any suitable material, typically it is made of metal or strong plastic. It may for example be made of stainless steel. It also possible to use a mesh where the openings below the fan are larger than the openings above the fan, whereby the spreading effect can be increased.

According to another embodiment, the device further comprises a second plate arranged at a distance D2 of the first plate and on a side of the first plate that is opposite the side of the fan. The second plate is thus arranged such that the repellent is arranged between the first and the second plates, i.e. the second plate is placed on top of the repellent, but preferably not in contact with it. The second plate is connected to the first plate via suitable connecting means, such as three, four or five studs connecting the plates together. The connecting means may be attached permanently or removably to the first and/or the second plate. This second plate further forces the evaporating repellent to spread along 360° on the by-pass flow of air. The distance D2 may be for example 30-60 mm. It may be for example from 30, 32, 35, 37, 40, 42, 45, 47, 50, 52 or 55 mm up to 35, 37, 40, 42, 45, 47, 50, 52, 55, 57 or 60 mm. The distance can be for example 40-55 mm or 45-50 mm.

In yet another embodiment, the device also comprises a third plate arranged at the first end of the support structure perpendicularly to a direction of height of the support structure. The third plate is thus arranged at the bottom of the support structure, and forms the base of the device. Such third plate has mainly the function of stabilising the device, especially if no mesh is used to surround the support structure.

The first plate may comprise means for attaching a mosquito repellent thereon. Such means are typically needed if the device is designed to be used with a burnable coil, and may not be needed if for example a device sold under the tradename of Thermacell® is used together with the present device. The present device may also be used with burnable oils, in which case the means would include a small container 30 (shown in FIG. 6), open at its top.

The first plate, the optional second plate and/or the optional third plate may be made of a material selected independently from ceramics and metals. The support structure is typically made of metal or plastic, such as reinforced plastic. An especially suitable metal is stainless steel, as the present device is most typically used outdoors.

The height H of the device may be for example 150-270 mm. The first plate, the optional second plate and/or the optional third plate typically have a circular shape, for example having a diameter of 140-280 mm. It is to be noted that the dimensions given here are for illustration only, and other dimensions are also possible. The diameter of the plate(s) may be the same or larger than the largest diameter of the support structure. The support structure may have a form (when seen from the first end towards the second end, i.e. in the direction of height of the support structure), that is a triangle, a square, a rectangle or a circle. The support structure may for example be formed of three or four bars, arranged equidistantly from each another, and form a triangle or a rectangle. Most typically, when a mesh is used, the overall form of the structural part is cylindrical, i.e. having a circular cross-section.

The present description also relates to a device for mosquito repellents, consisting of
  a support structure having a first end arranged to be positioned on a surface, and a second end opposite the first end, the distance between the first end and the second end defining a height H of the support structure;
  a first plate arranged at the second end of the support structure perpendicularly to a direction of height of the support structure, the plate being void of openings and suitable for receiving a heated mosquito repellent;
  a fan attached within the support structure, between the first end and the second end of the support structure, to blow air from the first end towards the second end of the support structure and the first plate; and
  means for operating the fan;

wherein a size and shape of the first plate is such that it covers the fan, when seen from the second end of the support structure in the direction of height of the support structure.

One particular device according to the present description is made of stainless steel, and has a height of 210 mm and a diameter of 215 mm. The diameter of the first plate is 215 mm, the diameter of the optional second plate is 215 mm, and the diameter of the optional third plate is also 215 mm. Should a mesh be used to surround the device, i.e. the support structure, it is made of stainless steel, with a mesh size of 35×20 mm.

One possible type of fan usable in the present device is ZALMAN QUIET FDB FAN, type ZM-F3 FDB (0.2 A), which is a fan typically used in computers. One possible type of transformer usable in the present device is STECKER NETZGERÄT, model MW3K10GS, 100-240 V, 60/50 Hz, 0.25 A. One possible battery to be used in the present device is a 1.2 Ah, 12 V battery.

The present description also relates to a method for improving dispersion of a mosquito repellent in air, consisting of
  arranging a mosquito repellent on a solid surface;
  blowing air from beneath the solid surface towards it; and
  dispersing the mosquito repellent by a by-pass flow of the air blown towards the solid surface.

The various embodiments and details described above in connection with the device apply mutatis mutandis to the method. Indeed, as described above and below in the Experimental part, the present method allows for an efficient spreading of the mosquito repellent over a large area, while also ensuring optimal use of the repellent.

Experimental Part

The present device was tested outdoors in an environment with mosquitoes, and it was found that it was efficient for a larger surface than if the mosquito repellent was used without the present device. The repellent products tested were a burnable coil and a Thermacell®-device with D-alletrine, temperature was measured using infrared FLUKE 62 MINI IR thermometer.

Best results were obtained with Thermacell® together with the present device, as this combination could keep a terrace of 40 m$^2$ free from mosquitoes, and its effect spread even further than the terrace. The burnable coil together with the present device also gave better results than the coil alone.

When using the present device, the temperature of the Thermacell® was 120-130° C., which is its designed optimal temperature. Thus, the Thermacell® device functioned in the temperature it was designed to function, and no cooling was observed.

As comparative examples, Thermacell® alone and a burnable coil alone were used, but their efficiency was significantly lower, as the vaporised/burned product raised upwards but did not spread over the test area.

Another comparative example was according to CN 208354435U, combined either with Thermacell® or with a burnable coil. It was observed, that the temperature of the Thermacell® device did not raise above 99-100° C. because of the cooling effect of the air flow, which lead to incomplete evaporation of the repellent product from the device. When using the burnable coil, the fan became sticky from the smoke, and the burnable coil extinguished on its own from time to time (again because of the cooling effect of the air flow).

DETAILED DESCRIPTION OF THE DRAWINGS

The aspects of the disclosed embodiments are explained in more detail in the following, with reference to the drawings. Similar elements have been indicated with the same reference numbers, but they may in practice be slightly different from one another.

FIG. 1 schematically illustrates a device according to a first embodiment. The device 1 has a support structure 2 having a first end 2a arranged to be positioned on a surface 3, and a second end 2b opposite the first end. The first end 2a is thus the lower end when the device is in use, and the second end 2b is the upper end when the device is in use. The distance between the first end and the second end define a height H of the support structure.

The device 1 further has a first plate 4 arranged at the second end 2b of the support structure 2, perpendicularly to a direction of height of the support structure 2 (and parallel to the surface 3). The device also has a fan 5 attached within the support structure 2, between the first end 2a and the second end 2b of the support structure 2, to blow air from the first end 2a towards the second end 2b of the support structure 2 and the first plate 4. The fan 5 is arranged at a distance D1 from the first end 2a of the support structure 2, and D1 is about 50% of the height H. The means for operating the fan 5 are not shown in the Figure. The size and shape of the first plate 4 are such that it is larger than the fan 5 and the support structure 2. A mosquito repellent 6 is arranged on top of the first plate 4.

Figure 2:
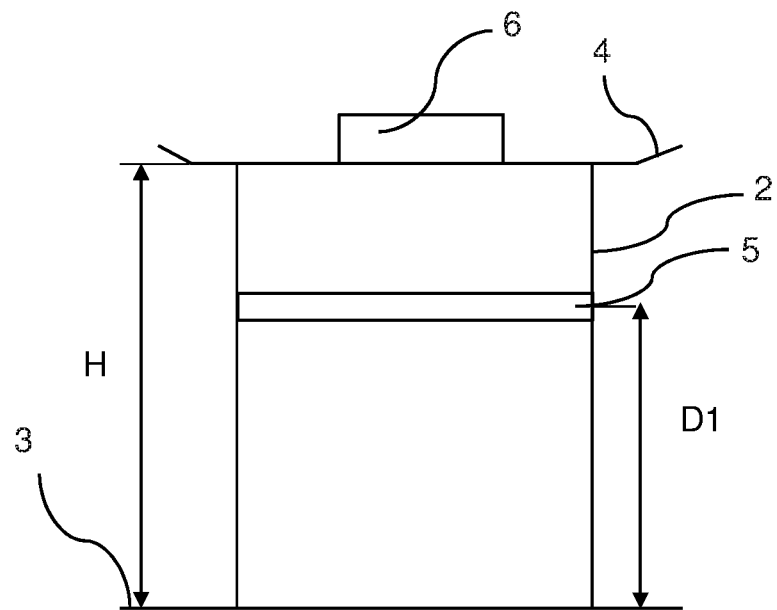
FIG. 2 schematically illustrates a device according to a second embodiment.

FIG. 2 schematically illustrates a device according to a second embodiment. In this embodiment, the height D1 is about 70% of the height H of the support structure when measured as indicated above, the other features remaining essentially identical to those of the embodiment in FIG. 1.

Figure 3:
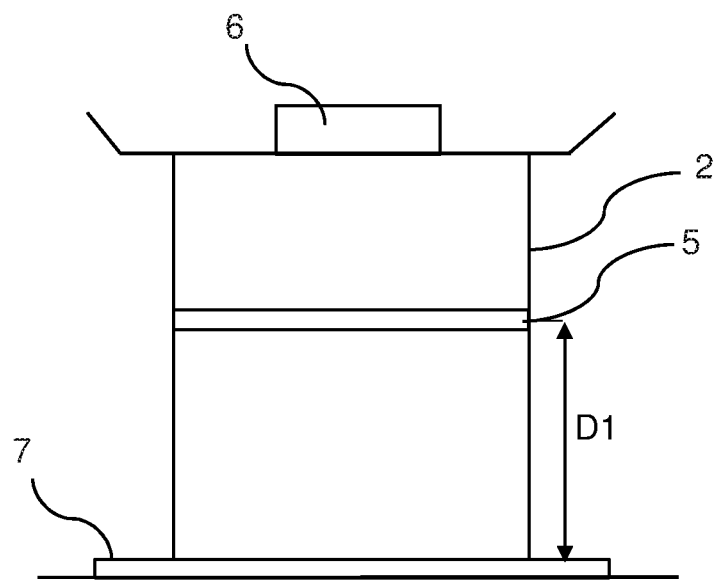
FIG. 3 schematically illustrates a device according to a third embodiment.

FIG. 3 schematically illustrates a device according to a third embodiment. In this embodiment, the device is equipped with a third plate 7 at the first end of the support structure 2, thus forming a bottom plate of the device. The height D1 is about 55% of H in this embodiment.

Figure 4:
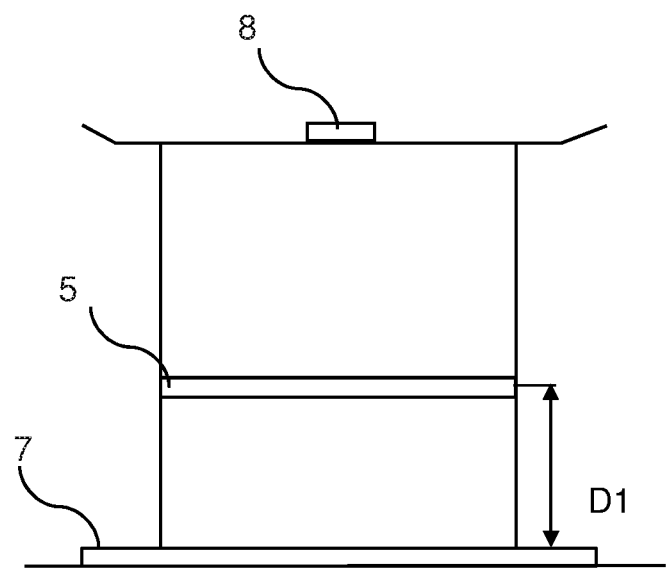
FIG. 4 schematically illustrates a device according to a fourth embodiment.

FIG. 4 schematically illustrates a device according to a fourth embodiment. In this embodiment, the height D1 is about 45% of H, and the mosquito repellent is a burnable coil 8.

Figure 5A:
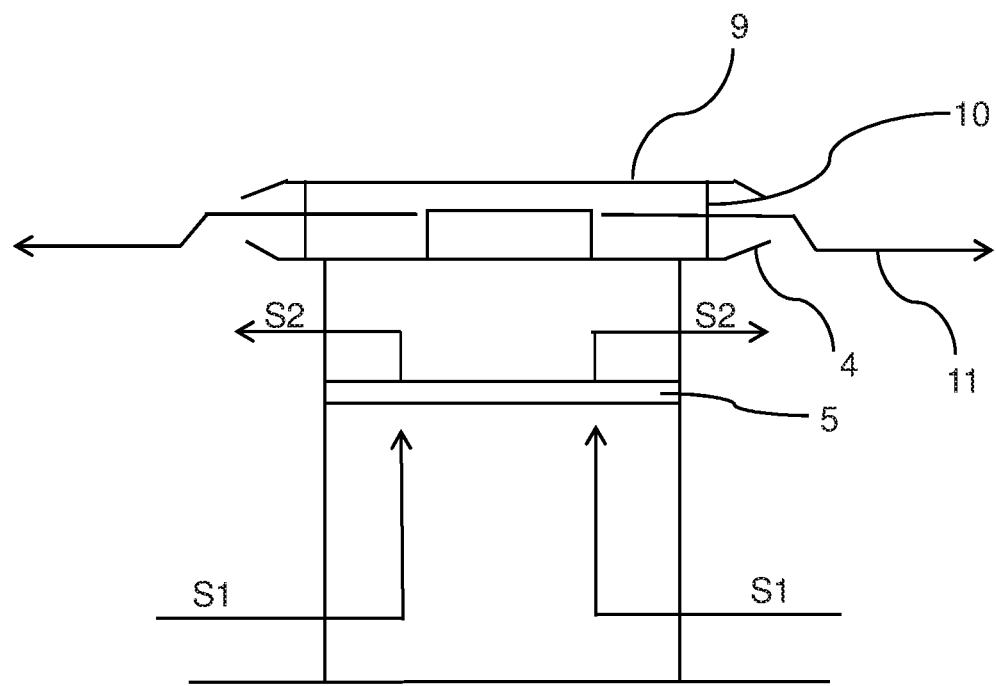
FIGS. 5A and 5B schematically illustrates a device according to a fifth embodiment as well as air circulation within the device.
Figure 5B:
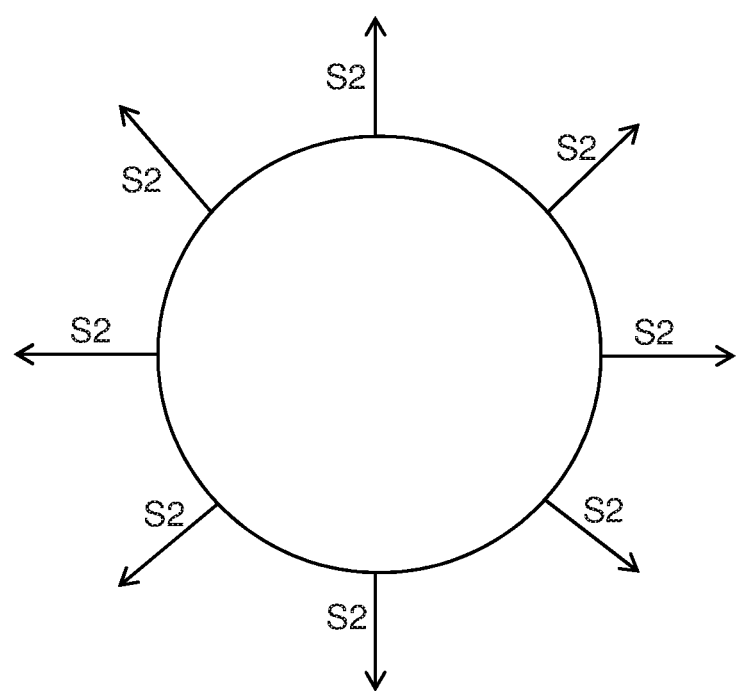

FIG. 5A schematically illustrates a device according to a fifth embodiment, where a second plate 9 is arranged above the first plate 4, to further enhance spreading of the repellent. The second plate 9 is connected to the first plate 4 via connecting means 10. FIG. 5A further illustrates air circulation within the device. The incoming, fresh air enters the device through the sides of the device, below the fan 5, and has a suction speed S1. It passes through the fan 5, and exits above the fan, having a blowing speed S2. The flow of the repellent is shown with arrows 11. The suction volume V1 is defined by the bottom of the device (or the surface on which it is located), the fan and the possible mesh surrounding the support structure. The blowing volume is defined by the fan, the first plate and the possible mesh surrounding the support structure (while if no mesh is present, the volume is defined by the virtual walls defined by the support structure). FIG. 5B is an illustration of the blowing air flows S2, seen from the top of the device, i.e. the air flows in all directions around the device.

Figure 6:
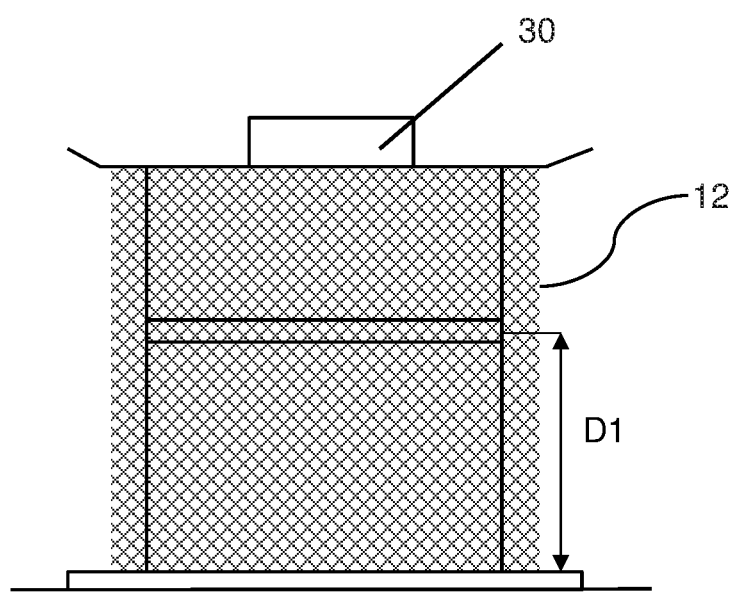
FIG. 6 schematically illustrates a device according to a sixth embodiment.

FIG. 6 schematically illustrates a device according to a sixth embodiment. The device comprises a mesh 12 surrounding the support structure.

The invention claimed is:
1. A device for mosquito repellents, comprising:
  a support structure having a first end arranged to be positioned on a surface, and a second end opposite the first end, the distance between the first end and the second end defining a height H of the support structure;

a first plate arranged at the second end of the support structure perpendicularly to a direction of the height H of the support structure, the first plate being void of openings and suitable for receiving a heated mosquito repellent; and a fan attached within the support structure, between the first end and the second end of the support structure, to blow air from the first end towards the second end of the support structure and the first plate;

wherein a size and shape of the first plate is such that the first plate covers the fan, when seen from the second end of the support structure in the direction of the height H of the support structure.

2. The device according to claim 1, wherein the fan is arranged at a distance D1 from the first end of the support structure, D1 being 5-80% of the height H.

3. The device according to claim 1, further comprising a mesh surrounding the support structure.

4. The device according to claim 1, further comprising a second plate arranged at a distance D2 of the first plate and on a side of the first plate that is opposite the side of the fan.

5. The device according to claim 4, wherein D2 is 30-60 mm.

6. The device according to claim 4, further comprising a third plate arranged at the first end of the support structure perpendicularly to a direction of the height H of the support structure.

7. The device according to claim 6, wherein the first plate, the second plate or the third plate is made of a material selected independently from ceramics and metals.

8. The device according to claim 6, wherein the first plate, the second plate or the third plate has a circular shape with a diameter of 140-280 mm.

9. The device according to claim 4, wherein the first plate comprises a first main area and a first peripheral edge that is bent relative to the first main area, and wherein the first main area is sized and shaped to cover the support structure, when seen from a direction from the second end to the first end.

10. The device according to claim 9, wherein the second plate comprises a second main area and a second peripheral edge that is bent relative to the second main area, and wherein the second main area is sized and shaped to cover the support structure, when seen from a direction from the second end to the first end.

11. The device according to claim 10, wherein the first peripheral edge and the second peripheral edge are bent toward each other.

12. The device according to claim 4, wherein the second plate is connected to the first plate by a plurality of studs.

13. The device according to claim 1, wherein the first plate comprises means for attaching a mosquito repellent thereon.

14. The device according to claim 1, wherein the height H is 150-270 mm.

15. The device according to claim 1, wherein the first plate comprises a first main area and a first peripheral edge that is bent relative to the first main area, and wherein the first main area is sized and shaped to cover the support structure, when seen from a direction from the second end to the first end.

16. A method for improving dispersion of a mosquito repellent in air, comprising:

arranging a mosquito repellent on a solid plate that is void of openings;

blowing air from beneath the solid plate towards the solid plate;

using the solid plate to change a direction of the air blown towards the solid plate so that the air flows radially and outwardly from the solid plate; and dispersing the mosquito repellent by a by-pass flow of the air flowing radially and outwardly from the solid plate.

* * * * *